United States Patent Office 3,215,221
Patented Nov. 2, 1965

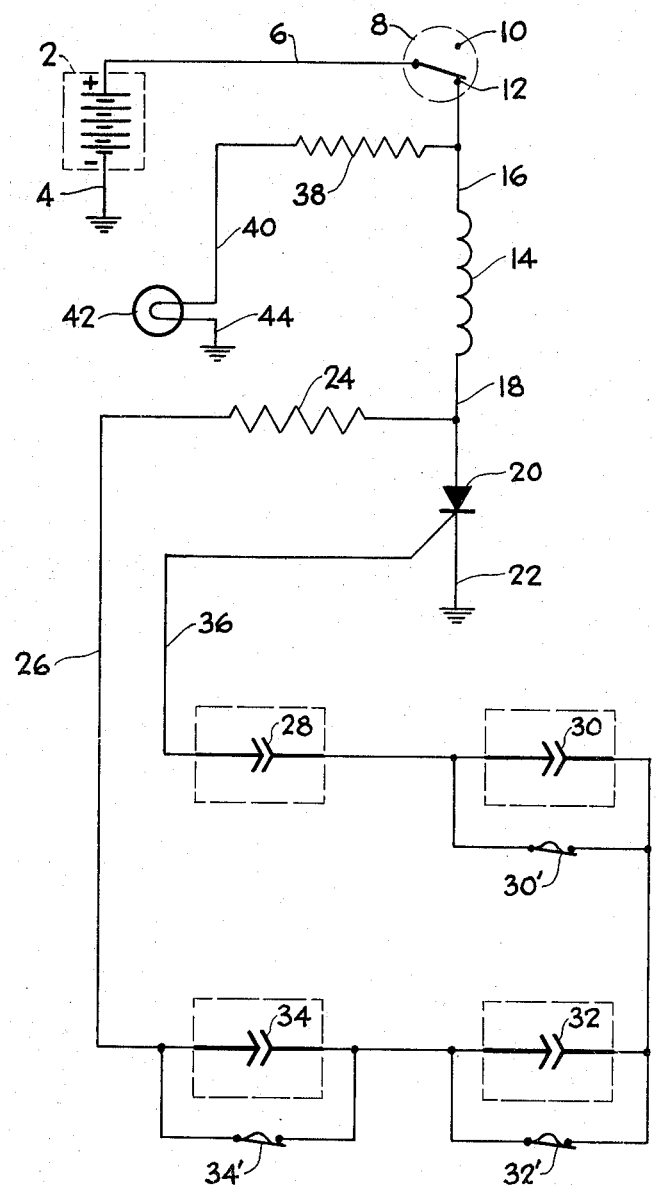

3,215,221
AUTOMOBILE SEAT BELT ASSEMBLY
Joseph Rayman, Fords, N.J., assignor to The M. Blatt Co., Trenton, N.J., a corporation of New Jersey
Filed Mar. 6, 1964, Ser. No. 349,999
5 Claims. (Cl. 180—82)

This invention relates to automobile seat belts and is particularly directed to novel means for assuring utilization of seat belts.

It is well known that automobile seat belts can significantly reduce the likelihood of serious injury or death in the event of an accident and the installation of seat belts has become quite popular. On the other hand, it is obvious that the installation of seat belts is of little value if the occupants of the automobile forget or neglect to fasten them. Accordingly, it has been proposed heretofore to provide means to prevent starting of an automobile unless the seat belts were connected. However, none of the prior art devices have been entirely satisfactory. Some of the prior art devices have employed electrically conductive seat belts which were connected in series with the battery and ignition switch so that the ignition switch could not energized unless the seat belts were fastened. However, this makes the full power of the battery available to flow through the seat belts which could lead to serious injury or possible electrocution of persons touching the seat belts. Alternatively, circuits have been proposed in which mechanical switches were connected in series with the battery and ignition switch and the seat belts were connected to actuate the mechanical switches when the seat belts were fastened. Unfortunately, because of the relatively high electric current in such circuits, the electrical contacts of these mechnical switches tend to become corroded so that eventually the circuit cannot be completed through them even if the seat belts are fastened. Prior seat belt safety devices have also been objectionable for the reason that they continually control the motor energizing circuit with the result that the motor will be stopped every time the seat belt is unfastened even though this may be necessary to reach something in the back seat or to let a passenger in or out of the car.

These disadvantages of the prior art are overcome with the present invention and a novel electrical circuit is provided wherein a silicon controlled rectifier is connected in series with an element of the automobile's electrical system which is critical to operation, such as the starter or automatic transmission. In addition, means are provided so that only the slight current required to control this rectifier is permitted to flow through the switching circuit that includes the seat belts.

The advantages of the present invention are preferably attained by connecting a silicon controlled rectifier in series with an element of the automobile's electrical system which is critical to operation, such as the starter or automatic transmission. As is well known, a silicon controlled rectifier presents an extremely high resistance when no current is applied to its control electrode, and a very low resistance when a current is applied to its control electrode. A shunt resistance is connected across the critical element and the rectifier and is chosen to have a resistance which is high compared to the combined resistances of the critical element and the rectifier when the rectifier is in its conductive state but is low compared to the combined resistances when the rectifier is in its non-conductive state. Thus, the critical element can only be energized when the rectifier is in its conductive state. The control current for the rectifier is drawn from the automobile's electrical circuit through a current limiting resistance and through the seat belts. However, as the amount of current needed to control the rectifier is very small, no hazard is presented to persons wearing the seat belts, and contact corrosion is minimized.

Accordingly, it is an object of the present invention to provide novel means for assuring utilization of automobile seat belts.

Another object of the present invention is to provide improved electric circuitry for assuring utilization of seat belts which presents no electrical hazard to wearers of the seat belts.

An additional object of the present invention is to provide improved electric circuitry for assuring utilization of seat belts wherein corrosion of contacts is minimized.

A specific object of the present invention is to provide novel means for assuring utilization of seat belts comprising a silicon controlled rectifier connected in series with an element of the automobile's electrical system which is critical to operation, resistance means connected in shunt with said critical element and said rectifier and having a resistance which is high compared to the combined resistances of said critical element and said rectifier when said rectifier is in its conductive state and low compared to said combined resistances when said rectifier is in its non-conductive state, a control circuit including the seat belts for supplying electric current to the control electrode of said rectifier, and a current limiting resistor connected to limit the amount of electric current flowing through said control circuit.

These and other objects and features of the present invention will be apparent from the following detailed description taken with reference to the accompanying drawing.

The single figure of the drawing is a diagrammatic representation of an electric circuit for assuring utilization of automobile seat belts embodying the present invention.

In the form of the invention chosen for purposes of illustration, an automobile battery 2 is shown having its negative side connected to ground by conductor 4 while its positive side is connected by conductor 6 to ignition switch 8. As shown, ignition switch 8 has one open contact 10 which the switch arm engages when the ignition is turned off and has a second contact 12 which serves to connect the battery 2 to the electrical system of the automobile. To avoid confusion, only those portions of the electrical system which are pertinent to the present invention have been illustrated. Coil 14 represents the solenoid controlling the starter motor and has one side connected by conductor 16 to contact 12 of ignition switch 8 while the other side is connected by conductor 18 to the anode of silicon controlled rectifier 20 and, thence, by conductor 22 to ground. As is well known, a silicon controlled rectifier is a device which presents a very low resistance to electric current flow therethrough when a current is applied to its control electrode but presents an extremely high resistance when no current is applied to the control electrode.

To control rectifier 20, current is passed through a current limiting resistor 24, having a resistance of the order of 100 ohms to reduce the current flow through the control circuit to a magnitude of a few milliamperes. From resistor 24, the control current is supplied by conductor 26 to the seat belts represented by switches 28, 30, 32 and 34 and is then applied by conductor 36 to the control electrode of the silicon controlled rectifier 20. In accordance with the present invention, the seat belts are formed of electrically conductive material or are provided with wires so that the buckle of the seat belt acts as a normally open switch and fastening of the seat belt serves to complete the circuit through the seat belt. In the illustrated example, four seat belts are provided as indicated by switches 28, 30, 32 and 34. This represents the circuit that would be employed for a four passenger vehicle. However, it will be apparent that the circuit could be easily altered to provide for more or fewer seat belts. Since it is important, whatever the number of seat belts, that the driver's seat belt is fastened, it will be seen that the control circuit cannot be completed unless the driver's seat belt represented by switch 28 is fastened. Preferably, all of the seat belts will be fastened. However, it frequently happens that one or more of the passenger seats will be unoccupied. To avoid the necessity of fastening the seat belts of vacant seats, normally closed pressure actuated switches 30', 32' and 34' are mounted within the passenger seats and are connected in parallel with the corresponding seat belts 30, 32 and 34. In this way, current can flow through the normally closed switches 30', 32' and 34' when the respective seats are unoccupied. On the other hand, if a passenger sits in one of the seats, the passenger's weight will open the pressure actuated switch in his seat, for example, switch 30'. This breaks the control circuit and requires that the associated seat belt 30 be fastened to re-complete the control circuit.

In operation, the driver may turn on ignition switch 8 and attempt to start the car. However, if the control circuit is broken at any of the seats, no control current will be applied to the control electrode of the silicon controlled rectifier 20. Consequently, rectifier 20 will act as an extremely high resistance in the circuit of starter solenoid 14 and the driver will be unable to start the car. To indicate that this condition exists, shunt resistor 38 is provided having one side connected to conductor 16 and having the other side connected by conductor 40 to a suitable indicating device 42, such as a buzzer or lamp, and thence through conductor 44 to ground. Shunt resistor 38 provides a resistance which is high compared to the combined resistances of solenoid 14 and rectifier 20 when rectifier 20 is in its conductive state, and which is low compared to the combined resistances when rectifier 20 is in its non-conductive state. Accordingly, when the control circuit is broken at any of the seat positions, no current will be applied to the control electrode of silicon controlled rectifier 20, thus causing rectifier 20 to be in its non-conductive state. Hence, current from battery 2 cannot flow through starter solenoid 14 but, instead, will flow through shunt resistor 38 to actuate indicating device 42. This will advise the driver that one or more of the seat belts is unfastened.

When the seat belts of all occupied seats have been fastened, the control circuit will be complete and current will be applied to the control electrode of silicon controlled rectifier 20 switching rectifier 20 to its conductive state. Current can now flow through starter solenoid 14 and rectifier 20 so that the driver can start the car.

Seat belt assemblies embodying the present invention possess a further characteristic and important advantage in that after the engine has been started and the switching rectifier has been converted to its conductive state, it is possible for the operator or any passenger to unfasten his seat belt if this should become necessary without stopping the engine. Thus, if the driver wants to reach for something in the back seat of a car or help someone in or out of the car or go back for something he has forgotten, the driver or any passenger can unfasten his seat belt and refasten it again without stopping the engine or interfering with its operation. This not only saves frequent drain on the battery and load on the starting motor but renders the assembly much more practical and serviceable in use. Accordingly, seat belt assemblies embodying the present invention serve in effect as a safety means for the starting circuit without controlling or limiting the operation and use of the automobile once it has been properly started with the seat belts fastened.

In the alternative, it may sometimes be desirable to permit the driver to start the engine of the automobile without requiring that the seat belts be fastened, for example, to enable the driver to warm up the engine. At the same time, it is desirable to prevent actual operation of the car without fastening the seat belts. To accomplish this, the solenoid switches of an automatic transmission or a solenoid actuated driveshaft lock may be substituted for the starter solenoid 14 of the circuit of FIG. 1 without altering the circuit.

The drawing shows the battery 2 having its negative terminal connected to ground. On the other hand, in some automobiles, the positive terminal of the battery is grounded and the negative terminal is connected to the car's electrical system. When this is true, the silicon controlled rectifier must be reversed. However, this will be well known to those versed in the art and does not otherwise alter the circuit shown.

Numerous other variations and modifications may also be made without departing from the present invention. Accordingly, it should be clearly understood that the form of the invention described above and shown in the figure of the accompanying drawing is illustrative only and is not intended to limit the scope of the invention.

I claim:

1. Means for assuring utilization of automobile seat belts comprising a solenoid critical to operation of the automobile, rectifier connected in series with said solenoid and including a control electrode, a control circuit adapted to be completed through said seat belts for supplying current to the control electrode of said rectifier, and a current limiting resistance connected to limit the amount of current flowing through said control circuit.

2. Means for assuring utilization of automobile seat belts comprising a solenoid critical to operation of the automobile, a rectifier connected in series with said solenoid and including a control electrode, a control circuit adapted to be completed through said seat belts for supplying current to the control electrode of said rectifier, a current limiting resistance connected to limit the amount of current flowing through said control circuit, resistance means connected in shunt with said solenoid and said rectifier having a resistance which is high compared to the combined resistances of said solenoid and said rectifier when said rectifier is conductive and which is low compared to said combined resistances when said rectifier is non-conductive, and indicating means connected in series with said shunt resistance.

3. Means for assuring utilization of automobile seat belts comprising a solenoid critical to operation of the automobile, a rectifier connected in series with said solenoid and including a control electrode, a driver seat belt, a plurality of passenger seat belts, a control circuit adapted to be completed through said driver and passenger seat belts for supplying current to the control electrode of said rectifier, a plurality of normally closed pressure actuated switches each connected in parallel with a respective one of said passenger seat belts and responsive to passenger weight to open said control circuit, and a current limiting resistance connected to limit the amount of current flowing through said control circuit.

4. Means for assuring utilization of automobile seat belts comprising a rectifier connected in series with the starter solenoid of the automobile, a driver seat belt and including a control electrode, a plurality of passenger seat belts, a control circuit adapted to be completed through said seat belts for supplying current to the control electrode of said rectifier, a plurality of normally closed pressure actuated switches each connected in parallel with a respective one of said passenger seat belts and responsive to passenger weight to open said control circuit, a current limiting resistance connected to limit the amount of current flowing through said control circuit, resistance means connected in shunt with said starter solenoid and said rectifier having a resistance which is high compared to the combined resistances of said solenoid and said rectifier when said rectifier is conductive and which is low compared to said combined resistances when said rectifier is non-conductive, and indicating means connected in series with said shunt resistance for indicating current flow through said shunt resistance.

5. Safety means for an automobile having an engine and a seat belt comprising an engine control circuit, a seat belt switch included in said circuit and adapted to be closed when said seat belt is fastened, current actuated means included in said engine control circuit and connected thereto in shunt relation to said seat belt which, said engine control circuit including an ignition switch connected in series with said seat belt switch and operable to complete said engine control circuit and start the engine when said seat belt switch is closed, said current actuated means being operable to maintain said engine control circuit energized after it has been energized by completion thereof by closure of said ignition switch and seat belt switch.

References Cited by the Examiner
UNITED STATES PATENTS 3,112,467  11/63  Benning.
3,133,277  5/64  Hood _____ 180—82 X BENJAMIN HERSH, *Primary Examiner.*

A. HARRY LEVY, *Examiner.*